Figure 1:
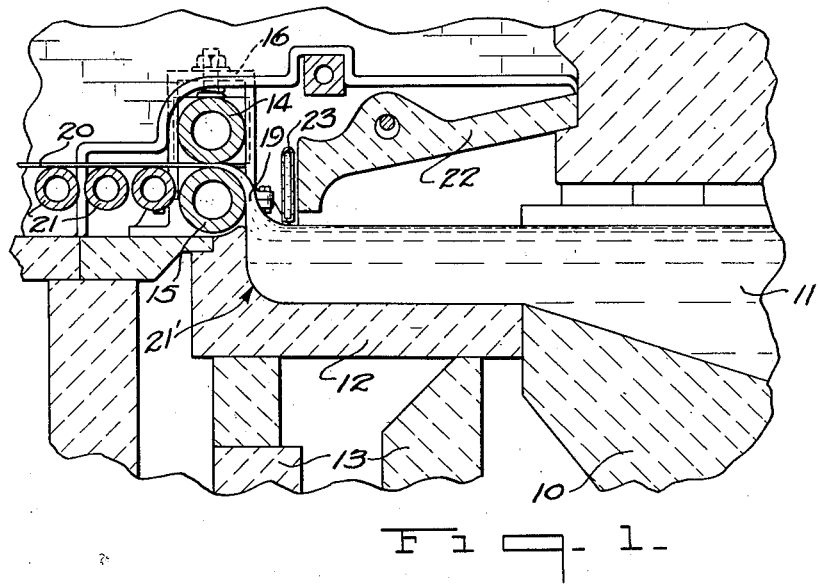

Sept. 15, 1931.  J. L. DRAKE  1,822,959

SHEET GLASS ROLLING APPARATUS

Filed Aug. 30, 1926

Inventor
John L Drake
By Frank Fraser,
Attorney

Patented Sept. 15, 1931

1,822,959

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

SHEET GLASS ROLLING APPARATUS

Application filed August 30, 1926. Serial No. 132,351.

The present invention relates to an improved method and apparatus for producing sheet glass, and has particular reference to an apparatus wherein a sheet of flat glass is continuously produced from a source of molten glass.

In certain apparatus for drawing sheet glass, such as that disclosed in the patent to Colburn, No. 1,248,809, granted Dec. 4, 1917, a sheet of glass is initially drawn upwardly from a mass of molten glass contained in a receptacle or draw pot, the sheet being subsequently deflected horizontally over a bending roll and passed through a suitable drawing mechanism into an annealing chamber. In this type of apparatus the sheet is drawn substantially from the center of the receptacle or draw pot, and it has been found that the glass at the forward end of the pot or in advance of the point of draw becomes relatively stagnant. In other words, the movement of the glass at this side of the sheet is much slower as compared with the movement of the glass at the opposite side or furnace side of the sheet.

The stagnant glass subsequently becomes devitrified and forms what is known as dog metal. The removal of this dog metal can only be accomplished by boiling out the pot, and in order to do this it is of course necessary that the drawing of the sheet be discontinued, which results in the loss of considerable time and reduces the output of the machine. Also, after a time some of the dog metal is apt to break away from the pot and find its way into the sheet, thereby resulting in the production of an inferior grade of glass. Again, after the drawing of a sheet has been discontinued, considerable time and labor must be expended to again resume the drawing thereof.

It is therefore the primary purpose and object of the present invention to provide improved sheet drawing apparatus wherein danger of dog metal forming in the pot will be reduced to a minimum.

Another object of the invention is the provision of improved sheet drawing apparatus wherein a continuous flow of the mass of glass through the draw pot will be assured, thus eliminating danger of the glass in the pot becoming relatively stagnant.

Another object of the invention is the provision of improved sheet glass drawing apparatus wherein the sheet is drawn from the end of the pot remote from the end at which the mass of molten glass enters.

Another object of the invention is the provision of means at the forward end of the pot for drawing a body of molten glass therefrom, and subsequently reducing this body of glass to sheet form.

Other objects and advantages of the invention will become more apparent during the course of the following description.

Figure 2:
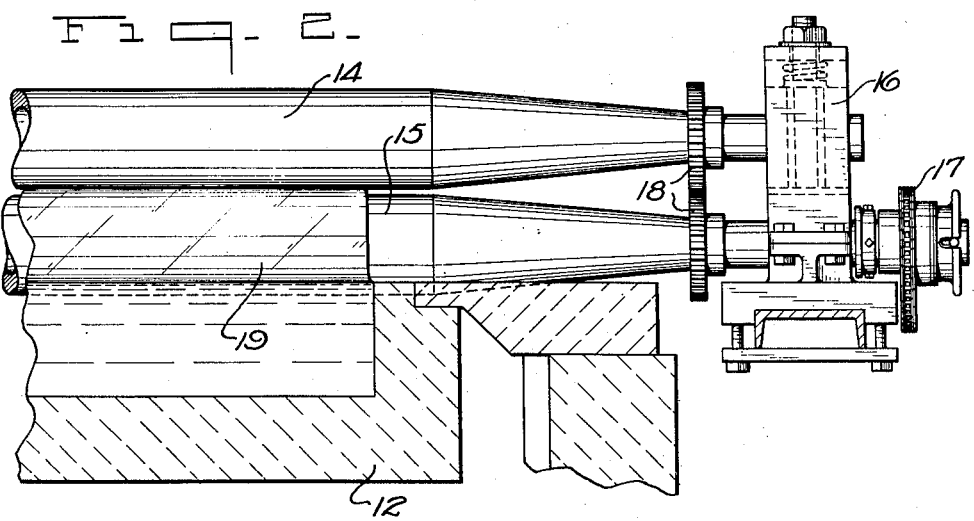
Figure 3:
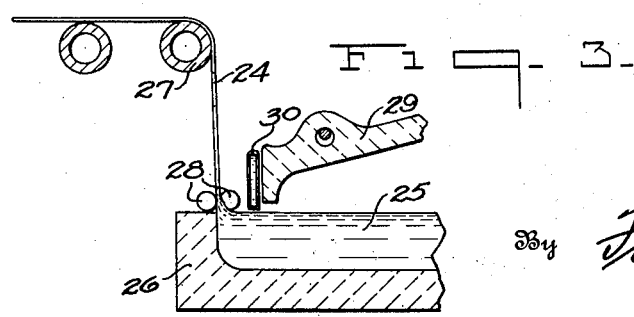

In the drawings wherein like numerals are employed to designate like parts throughout the same, Fig. 1 is a longitudinal vertical section through an improved sheet glass drawing apparatus constructed in accordance with the present invention, Fig. 2 is a transverse section through approximately one-half of a sheet glass drawing apparatus, and Fig. 3 is a somewhat modified form of the present invention.

Referring now in detail to the accompanying drawings, and more especially to Figs. 1 and 2, the numeral 10 generally designates a portion of a tank furnace in which the glass batch is melted and treated. After the glass source 11 has been properly treated, it is permitted to pass into the draw pot or receptacle 12 which is mounted upon stools 13 arranged within a heating chamber.

Positioned above the forward end of the draw pot 12 is a pair of rotatable members 14 and 15 arranged relative to one another to create a sheet forming pass. The rolls 14 and 15 are preferably provided with an internal bore to permit the circulation of a suitable temperature control medium therethrough, and the outer surfaces of the rolls are preferably smooth and polished, while the composition may be cast iron, nichrome, monel, stellite, etc. The opposite ends of the rolls are supported in brackets 16, the rolls having suitable journal connections therewith and being driven by means of a gear and chain arrangement 17, and gears 18. The rolls are adapted to be adjusted relative to one another to permit various thicknesses of sheet to be produced.

In producing the glass sheet a body of glass 19 is initially drawn upwardly from the forward end of the draw pot 12, and this body of glass is subsequently deflected horizontally and passed between the rolls 14 and 15 which reduce the body to sheet form as indicated at 20. The sheet 20 is supported upon a plurality of idler rolls 21 and is subsequently passed through a suitable drawing mechanism into an annealing chamber as is well known in the art.

Thus, it will be appreciated that inasmuch as the glass is drawn from the forward end of the pot 12, a continuous flow of glass through the draw pot will be assured, and danger of any of the glass becoming relatively stagnant in the pot will be reduced to a minimum. It is also to be noted that the forward end of the draw pot is curved as indicated at 21', to permit a free upward sweep of the glass and eliminate any corners wherein the glass might settle. A suitable lip tile 22 and lip tile cooler 23 are positioned adjacent the body of glass 19 to assist in properly conditioning the glass whereby to permit the sheet to be drawn therefrom.

In Fig. 3, wherein has been shown a somewhat modified form of the present invention, a sheet of glass 24 is drawn upwardly from a mass of molten glass 25 contained within the draw pot 26, and this sheet is subsequently deflected horizontally over a single bending roll 27. Edge treating means 28 is also provided in order to maintain the sheet to width, and a lip tile 29 and lip tile cooler 30 are provided to assist in properly conditioning the glass so that the sheet may be drawn therefrom.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. An apparatus for producing sheet glass, embodying a receptacle containing a mass of molten glass, and a pair of superposed rotatable members arranged above the receptacle at one end thereof, said members being positioned in advance of the mass of molten glass with the lower portion of the periphery of the bottom member being arranged at substantially the level thereof, said rotatable members being adapted to draw a body of glass upwardly from the adjacent end of the receptacle and to reduce the body of glass to a sheet of substantially predetermined thickness.

2. An apparatus for producing sheet glass, embodying a receptacle containing a mass of molten glass, and a pair of rotatable members arranged above the receptacle at one end thereof, said members being so positioned with respect to the molten mass that upon rotation thereof they will act to draw a relatively thick, heavy body of glass in a substantially vertical direction from one extreme end of said mass and reduce the same to a sheet of substantially predetermined thickness.

3. An apparatus for producing sheet glass, embodying a receptacle containing a mass of molten glass, and a pair of rotatable members arranged above the receptacle at one end thereof, said members being so positioned with respect to the molten mass that upon rotation thereof they will act to draw a relatively thick, heavy body of glass in a substantially vertical direction from one extreme end of said mass and reduce the same to a sheet of substantially predetermined thickness, with one of said members acting as a bending member for deflecting the glass from the vertical to the horizontal.

4. An apparatus for producing sheet glass, embodying a receptacle containing a mass of molten glass, and a pair of superposed rotatable members arranged above the receptacle at one end thereof, said members being so positioned with respect to the molten mass that upon rotation thereof they will act to draw a relatively thick, heavy body of glass in a substantially vertical direction from one extreme end of said mass inwardly of the adjacent end wall of said receptacle and reduce it to a sheet of substantially predetermined thickness.

5. An apparatus for producing sheet glass, embodying a receptacle containing a mass of molten glass, and a pair of superposed rotatable members arranged above the receptacle at one end thereof and acting to draw a relatively thick, heavy body of glass in a substantially vertical direction from said mass and reduce it to a sheet of substantially predetermined thickness, said members being so positioned with respect to the molten mass that the point of generation of the upwardly moving body of glass will be located at the extreme adjacent end of said receptacle.

6. An apparatus for producing sheet glass, embodying a receptacle containing a mass of molten glass, and a pair of superposed rotatable members arranged above the receptacle at one end thereof, said members being positioned in advance of the mass of molten glass with the innermost portions of their peripheries arranged in substantial vertical alignment with the inner surface of the adjacent end wall of said receptacle, said rotatable members being adapted to draw a body of glass upwardly from the adjacent end of the receptacle and to reduce it to a sheet of substantially predetermined thickness.

7. An apparatus for producing sheet glass, embodying a receptacle containing a mass of molten glass and having an open end and a closed end, and a pair of superposed rotatable members positioned above the closed end of the receptacle, said members being arranged with the lower portion of the periphery of the bottom member at substantially the level of the molten mass and the innermost portions of the peripheries of both members in substantial vertical alignment with the inner surface of the adjacent end wall of said receptacle, said rotatable members being adapted to draw a body of glass upwardly from the adjacent end of the receptacle and to reduce it to a sheet of substantially predetermined thickness.

8. An apparatus for producing sheet glass, embodying a receptacle containing a mass of molten glass, and a pair of rotatable members arranged above the receptacle at one end thereof, at least one of said members being positioned in advance of the mass of molten glass with the lower portion of its periphery being arranged at substantially the level thereof, said rotatable members being adapted to draw a body of glass upwardly from the adjacent end of the receptacle and to reduce the body of glass to a sheet of substantially predetermined thickness.

9. An apparatus for producing sheet glass, embodying a receptacle containing a mass of molten glass, and a pair of rotatable members arranged above the receptacle at one end thereof, at least one of said members being positioned in advance of the mass of molten glass with the innermost portion of its periphery arranged in substantially vertical alignment with the inner surface of the adjacent end wall of said receptacle, said rotatable members being adapted to draw a body of glass upwardly from the adjacent end of the receptacle and to reduce it to a sheet of substantially predetermined thickness.

10. An apparatus for producing sheet glass, embodying a receptacle containing a mass of molten glass and having an open and a closed end, and a pair of rotatable members positioned above the closed end of the receptacle, said members being arranged with the lower portion of the periphery of at least one member at substantially the level of the molten mass and the innermost portion of the periphery of said member in substantial vertical alignment with the inner surface of the adjacent end wall of said receptacle, said rotatable members being adapted to draw a body of glass upwardly from the adjacent end of the receptacle and to reduce it to a sheet of substantially predetermined thickness.

11. In combination, a glass tank having a vertical end wall, a pair of superposed rolls positioned above said end wall which cooperate with each other to shape the glass into sheet form, and means for rotating said rolls so as to draw a body of glass upwardly from the adjacent end of the tank over the lower roll and between the two rolls.

Signed at Toledo, in the county of Lucas and State of Ohio, this 27th day of August, 1926.

JOHN L. DRAKE.